Nov. 30, 1965    R. J. AHLMAN ETAL    3,220,662
DEVICE FOR LOADING AND UNLOADING A PLURALITY
OF REELS ON AN ARBOR
Filed July 2, 1963    3 Sheets-Sheet 1
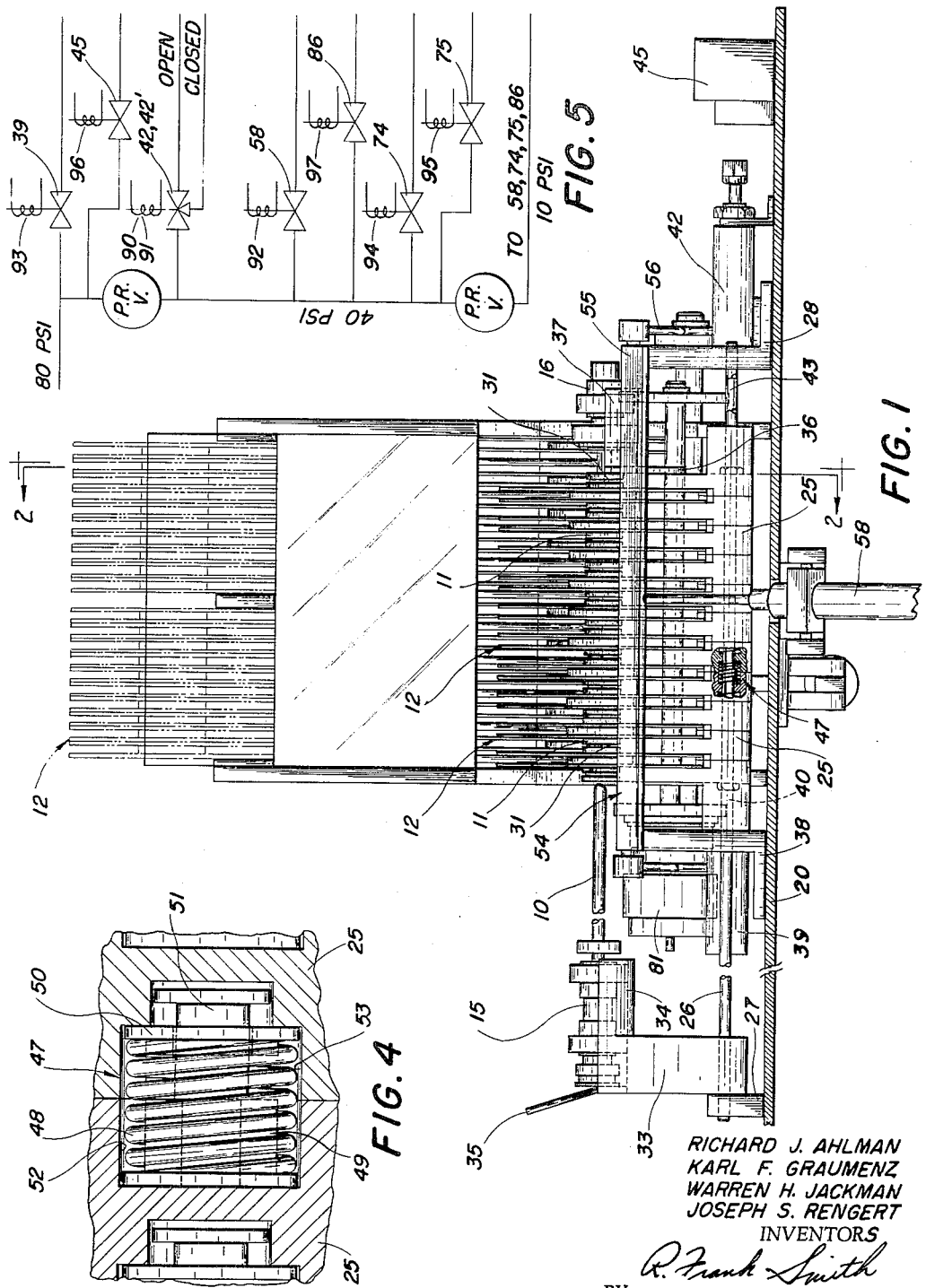
RICHARD J. AHLMAN
KARL F. GRAUMENZ
WARREN H. JACKMAN
JOSEPH S. RENGERT
INVENTORS
BY R. Frank Smith
Lloyd F. Seebach
ATTORNEY & AGENT

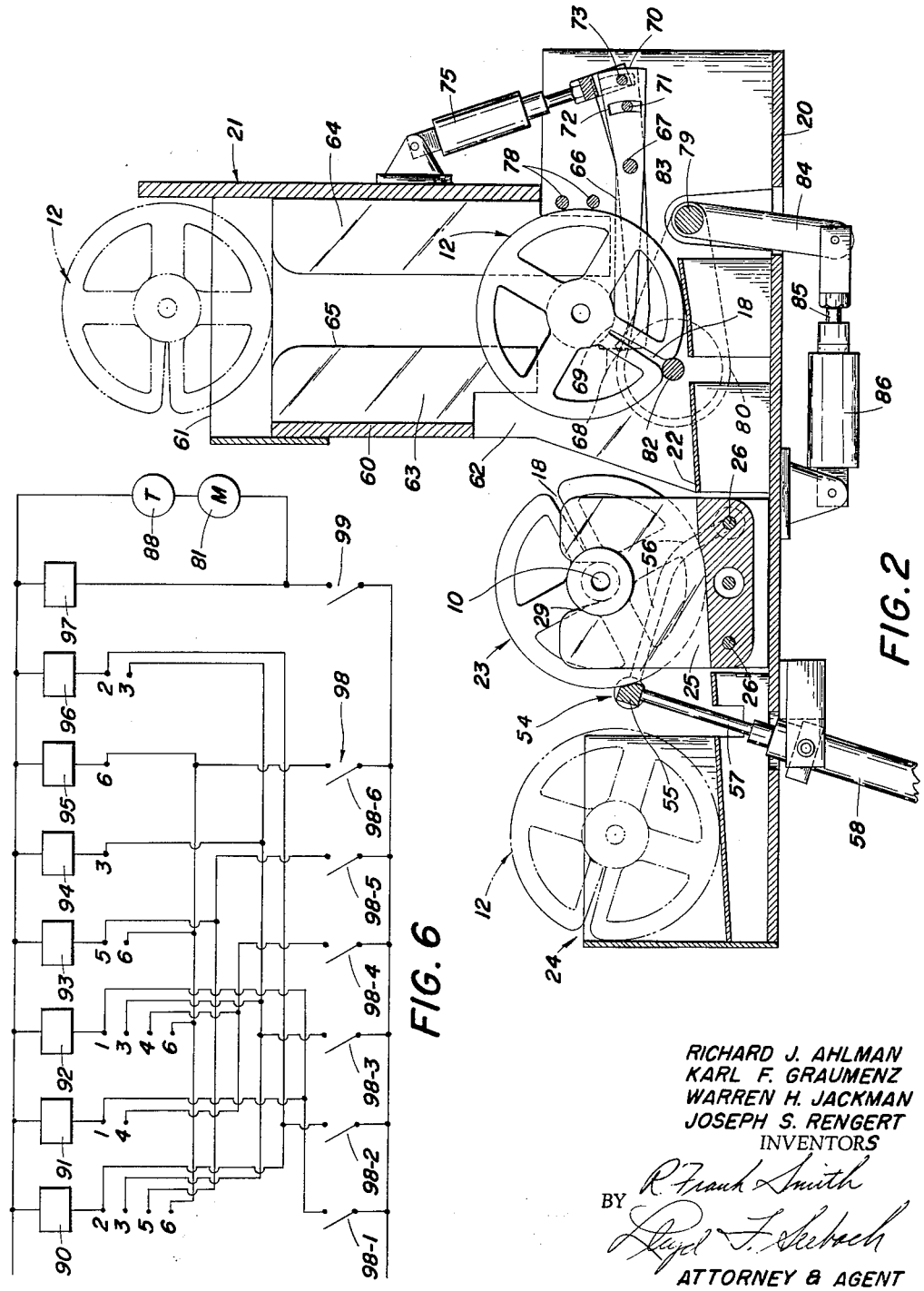

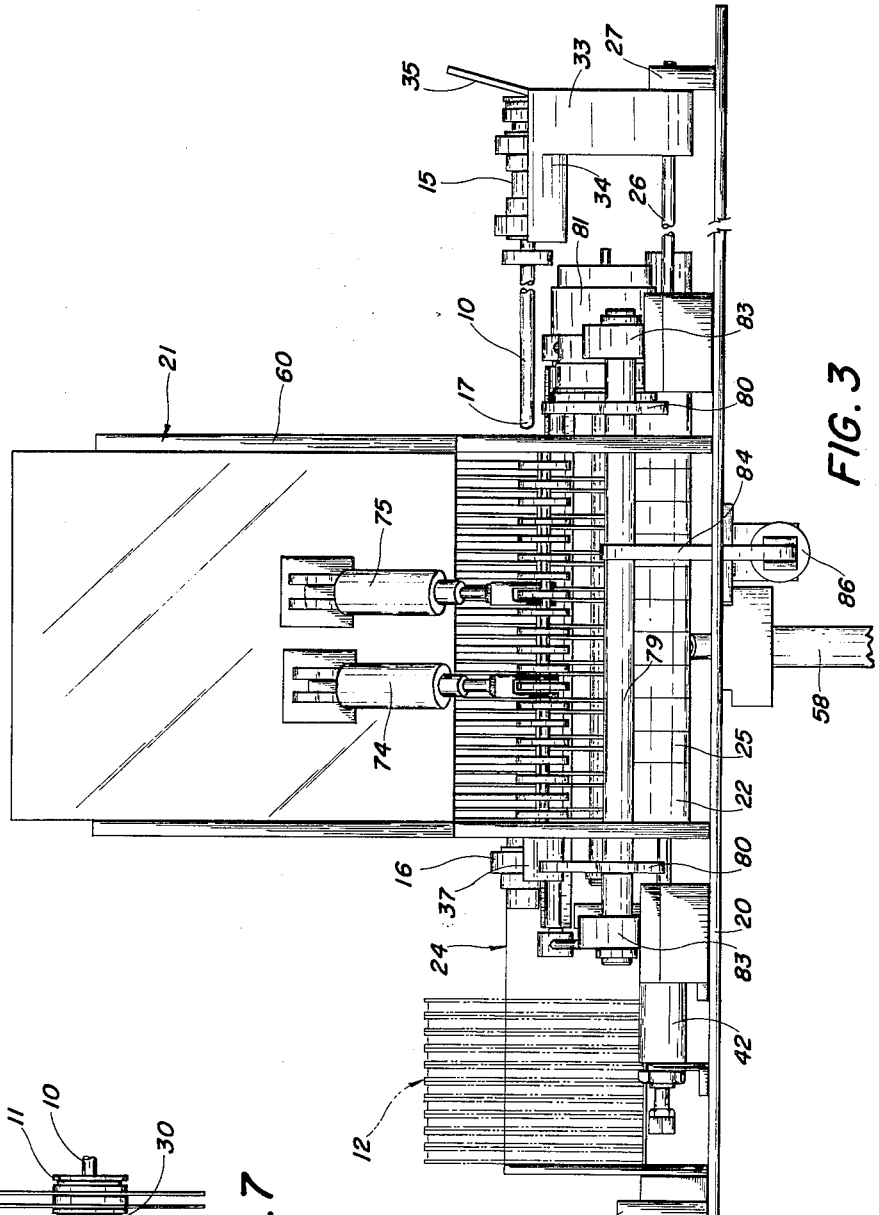

United States Patent Office
3,220,662
Patented Nov. 30, 1965

3,220,662
DEVICE FOR LOADING AND UNLOADING A PLURALITY OF REELS ON AN ARBOR
Richard J. Ahlman, Karl F. Graumenz, Warren H. Jackman, and Joseph S. Rengert, Rochester, N.Y., assignors to Eastman Kodak Company, Rochester, N.Y., a corporation of New Jersey
Filed July 2, 1963, Ser. No. 292,273
31 Claims. (Cl. 242—68)

The present invention relates to a device for removing an arbor from one set of reels rotatably mounted thereon and inserting the same arbor into another set of reels, and more particularly to a device that retains a plurality of drive units arranged between the reels for transmitting the rotation of the arbor to the reels in axial alignment with each other and the arbor during removal of the arbor and separation therefrom of the one set of reels and positioning of the other set of reels in axial alignment with the drive units and insertion of the arbor.

In the winding of a plurality of webs or strands of a material onto a plurality of reels, such reels are usually mounted on an arbor and rotated thereby to wind up the respective webs or strands. When the reels are fully wound, the arbor with the full reels is removed from the machine and the full reels removed from the arbor and replaced with empty reels. Usually, this removal and replacing of the reels is done by the operator who manually removes each individual reel, and after the group has been removed from the arbor, replaces the full reels with empty reels in the same relationship on the arbor. The reels can be releasably coupled to the arbor or can be freely rotatable on the arbor and driven by units that are releasably coupled to the arbor and arranged between each two consecutive reels thereon. In the latter case, the operator is required to not only handle the full and empty reels, but also the drive units and, when loading the empty reels, must be sure that a drive unit is positioned between each of the empty reels.

In the device disclosed hereinafter, an assembly comprising the arbor, the loaded reels, and the drive units is supported by spaced and movable members that are arranged in a mounting station for engaging each of the drive units. This arrangement permits the arbor to be readily withdrawn from the assembly, the full reels to be released from their positions between the drive units and a group of empty reels to be brought into position and alignment with the drive units so that the arbor can be reinserted through the reels as well as through the drive units. In order to release the full reels, the members that support the drive units are moved in a direction to increase the space therebetween, the larger space permitting the full reels to readily drop or roll out and facilitating receipt of the group of empty reels. In addition, the invention provides for orienting the usual radial loading slots in the reels to facilitate fastening the material to be wound on the reels when the arbor with the empty reels is placed in its wind-up position. This is accomplished before the group of reels is moved into the mounting station by means which rotates the reels until each slot engages said means.

The primary object of the invention is to facilitate replacement of a set of reels rotatably mounted on an arbor.

Another object of the invention is to replace a set of flanged reels rotatably mounted on a splined arbor while drive units, positioned between successive reels on the arbor and releasably coupled thereto, are retained in axially aligned relation with each other.

Still another object of the invention is to withdraw an arbor from a set of reels rotatably mounted thereon and axially separated from each other by drive units releasably coupled to the arbor, whereby the reels and drive units are retained in axial alignment after the arbor has been withdrawn.

A further object of the invention is to mount a set of reels on an arbor with the reels axially separated from each other by spacers.

A still further object of the invention is to provide a device for receiving a group of reels having radial loading slots and discharging said group of reels with their rods arranged in an oriented relationship.

These and other objects and advantages of the invention will be apparent to those skilled in the art by the description which follows.

Reference is now made to the accompanying drawings in which like numerals designate like parts and wherein:

FIG. 1 is a front view of the device showing the relationship of the supporting members for the arbor and the magazine for the reels, the arbor being shown in a withdrawn position;

FIG. 2 is a vertical section taken substantially on the line 2—2 in FIG. 1 and showing the relationship of the FIG. 5 is a schematic diagram of the air cylinders path of movement of the reels from the mounting station to the receiving unit;

FIG. 3 is a rear view of the device showing the arrangement for actuating alternate retaining members for the reels that are arranged in the storage means therefor;

FIG. 4 is a detail sectional view of the resilient means for separating the drive unit holding members;

FIG. 5 is a smchematic diagram of the air cylinders for operating various elements of the device;

FIG. 6 is a schematic wiring diagram showing the sequential control of the air cylinders by means of a stepping switch; and FIG. 7 is an elevation view of the arbor and several reels mounted thereon with the drive units arranged therebetween.

With respect to FIG. 7, the numeral 10 designates an arbor having a plurality of axial keyways for receiving a number of balls retained within each of the drive units 11 which are retained between the flanged reels 12. A complete disclosure of the drive unit 11 is shown in a copending application Serial No. 292,304 filed July 2, 1963. The reels 12 comprise a central hub 13 and spaced flanges 14 between which the web or strand of material is wound. Although the reels 12 are shown as having two flanges, such a reel can be of the type having only one flange or can simply be a core on which the material is wound. Accordingly, where reference is made in the following description to a reel, it is to be understood that any one of the three above embodiments are to be considered as a reel.

The arbor 10 is provided with a bearing sleeve 15 which is fixed to one end of the arbor and a bearing sleeve 16 into which the other end 17 is inserted. In an assembled arrangement, the sleeves 15 and 16 are received by suitable journal members in the windup machine for rotating the arbor whose rotation is transmitted to the reels 12 by the drive units 11.

A work bed, generally designated by the numeral 20, comprises a flat plate or the top of a bench on which the device is mounted. As shown in FIG. 2, the reels 12 are retained in a storage device 21 having an inclined plane 22 for providing a path of movement for the reels into a mounting station 23 and a receiving unit 24, the reels separated from the arbor moving along the same plane from the mounting station into the receiving unit. The manner in which these various stations cooperate in the loading and unloading of the reels 12 from the arbor 10 will be described in more detail hereinafter.

The mounting station 23 comprises a plurality of members 25 that are mounted for axial movement on a pair of spaced rods 26 which, in turn, are supported in spaced relation from the work bed 20 at one end by a pair of support members 27 and at the other end by a bracket 28. The members 25, which are of a shape as best shown in FIG. 2, are each provided with a recess 29 which engages a recess 30 in each of the drive units 11. The upper portion 31 of each of the members 25 is reduced in thickness so as to be readily receivable by the recess 30. As shown in FIG. 1, the members 25 are in a closed position in which each of the members abut one another and the portions 31 are spaced in accordance with the spacing of recess 30 so as to support the arbor 10 when the latter is positioned thereon. The portions 31 of members 25 that engage the recesses 30 hold the drive units in an axially aligned relationship to facilitate insertion of the arbor 10 as described hereinafter.

As seen in FIG. 1, a bracket 33 is slidably mounted on the rods 26 and is provided with a yoke 34 for receiving the bearing sleeve 15. The bracket 33 is also provided with a handle 35 for moving the bracket in an axial direction for a purpose to be described hereinafter. On the right-hand side of the members 25, a bracket 36 is secured to the end member 25 and is provided with a yoke 37 for receiving the bearing sleeve 16. The rods 26 are also journaled in a bracket 38 that is fixed to the work bed 20 and carries an air cylinder 39 whose piston rod 40 extends through the bracket 38 and has its free end fixed to the left-hand end member 25 at the center thereof. The bracket 28 is fixed to work bed 20 to the right of mounting station 23 and carries an air cylinder 42 whose piston rod 43 extends through the bracket 28 and has its free end fixed to the outermost member 25 at the right-hand end. An air cylinder 45 is arranged on work bed 20 to the right of air cylinder 42 and serves as a stop for limiting the movement of piston rod 43 for a purpose to be described hereinafter.

With reference to FIG. 4, between each of members 25 a resilient means, designated generally by the numeral 47, is provided which serves to move the respective members 25 in an axial direction for separating the members to permit removal of one set of reels and replacement thereof with a second set of reels. The resilient means 47 comprises a spring 48 that is retained between a sleeve 49 and a washer 50 which are retained by a stud 51. These elements are contained within a counterbore 52 in one side of each of members 25 and a counterbore 53 in the other side of each of members 25, the outer left-hand member 25 having only a counterbore 52 and the outer right-hand member 25 having only a counterbore 53.

From the description thus far, an arbor 10 with a plurality of drive units 11 and reels 12 arranged thereon as shown in FIG. 7, is supported in a position for receiving the webs or strands of material that are to be wound on the central hubs 13 and between the flanges 12. When the reels have been fully wound, the assembly comprising arbor 10, bearing sleeves 15 and 16, reels 12 and drive units 11, is removed from the winding device and positioned in the mounting station 23. At this time, the brackets 33 and 36 are in a position adjacent the end members 25 with members 25 in a closed position, as shown in FIG. 1. When the assembled arbor is positioned in mounting station 23, the portions 31 of members 25 will engage the recess 30 in each of the drive units 11 and the bearing sleeves 15 and 16 will be received by the respective yokes 34 and 37. The arbor 10 and reels 12 will therefore be supported by the members 25 with a reel 12 arranged in the space between each of the members 25. In this position, the bracket 33 is moved to the left along rods 26 by means of handle 35, and since arbor 10 is fixed to bearing sleeve 15 which is held by yoke 34, bracket 33 is moved until the arbor is completely withdrawn from bearing sleeve 16 and all of the drive units and reels mounted on the arbor. A bail member 54 comprises an axially extending rod 55 that is supported in relation to the periphery of the flanges 14 of the reels by the arms 56 that are pivotally mounted on the right-hand rod 26, as shown in FIG. 2. The rod 55 is connected to the piston rod 57 of the air cylinder 58, as shown in FIG. 2, and is movable thereby to a position below the inclined plane 22 so as to permit the full reels between the members 25 to separate from the drive units when the members 25 are moved to an open position by movement down inclined plane 22 into receiving unit 24. In this station, the full reels are moved to the right, as shown in FIG. 3, and then removed as a group. As will be described hereinafter with respect to a complete cycle of operation, the air cylinder 42 moves the member 25, to which its piston rod 43 is connected, to the right and the springs 48 between each of the members 25 serve to spread the members to the right and an open position in which the full reels 12 can separate from the drive units 11 and roll down the plane 22 to the receiving unit 24. While members 25 are in this open position, the bail member 54 is returned to its engaging and holding position and a second set of reels is released from the storage device 21 for movement into the spaces between members 25 and against rod 55 where they are held in axial alignment with the drive units 11 which are retained in axial alignment on members 25.

The storage device 21 comprises a vertically arranged enclosure 60 having an open top 61 and a discharge opening 62 at the side thereof facing the mounting station 23. A plurality of guide plates 63 are secured to one side of enclosure 60 in spaced relation and in alignment with a second plurality of guide plates 64 fixed to the back surface of the enclosure 60. The inner edges of the guide plates 63 and 64 provide a plurality of vertical slots or tracks 65 which are of a width slightly larger than the diameter of the central hubs 13 of the reels 12. Near the bottom of each of the tracks 65, a retaining member 66 is pivotally mounted intermediate its ends at 67 and, at the end 68 adjacent its respective track 65, is formed with an arcuate nose 69 for engaging the central hub 13 of a reel. The other end 70 is provided with an arcuate slot 71 and connected to one of the rods 72 or 73 which, in turn, are actuated by one of the air cylinders 74 or 75, as described hereinafter.

As mentioned above, the reels 12 can be provided with a single flange or a pair of flanges. In either case, the flanges are usually provided with at least one loading slot 18 which must be oriented with the other slots in the same group of reels when positioned on the arbor 10. The means for orienting these radial slots comprises a pair of spaced plates 80 on one of which a motor 81 is mounted for driving a rod 82 that extends across the group of reels and can be moved into engagement with the flanges of all of the reels in the enclosure 60 and retained by members 66. The plate 80 is fixed to a shaft 79 that is journaled in a pair of spaced bearings 83 and is moved from a disengaged position below inclined plane 22 to an engaging position by means of a link 84 that connects shaft 79 to the piston rod 85 of an air cylinder 86.

When a group of reels 12 is positioned at the open top 61, the flanges of each reel straddle a pair of the guide plates 63 and 64 so that each hub 13 enters one of the vertical tracks 65. The reels then move vertically downward until their movement is arrested by the arcuate nose 69 of the retaining members 66 in which position all of the reels are then retained. With actuation of the air cylinder 86, the motor 81 is also energized and drives the rod 82. The air cylinder 86 moves the link 84 in a clockwise direction and, in turn, moves the plate 80 in the same direction so as to bring rod 82 into engagement with the peripheries of the flanges of the reels 12. If a radial slot 18 is engaged by the rod 82, this particular reel or reels will not be rotated because rod 82 will partially enter slot 18, as shown in FIG. 2. However, the flanges of those reels that are engaged by rod 82 are caused to be lifted from noses 69 and held against a pair of freely rotatable rods 78 that extend across the back of enclosure 60. In this position, the reels are rotated until the radial slots 18 thereof engage the rod 82, at which time the reel assumes its original position and no further rotation is imparted thereto by rod 82. When this is accomplished with respect to all of the reels, the radial slots in each of the reels in the enclosure 60 will be properly oriented and the plate 80 can then be moved in a counterclockwise direction by air cylinder 86 so as to disengage rod 82 from the reels. A timer 88 is arranged in conjunction with motor 81 so as to de-energize the motor after a predetermined interval of time which is equivalent to the maximum peripheral movement required of any one reel for its radial slot to engage rod 82. It is to be understood that the same arrangement for orienting the radial slots can be used irrespective of whether a reel 12 has one such radial slot and only one flange, such a radial slot in only one of its two flanges or a radial slot in both of its flanges. When the reel 12 has only one radial slot in one of its two flanges, the rod 82 can be provided with undercut portions so that only the flange having the radial slot is actually engaged by the rod 82.

While the invention described thus far has not been concerned with the number of reels mounted on the arbor 10, the invention has been successfully used in an application wherein ten reels are removed from and mounted on the arbor 10 as a set. For such application, the enclosure 60 is of a size so as to accommodate twenty reels with alternate reels comprising a set for movement into the spaces between members 25. In order to release alternate reels from the group in enclosure 60, the rods 72 and 73 are fixed to alternate ones of retaining members 66 and pass through the arcuate slot 71 in those members to which they are not secured. Therefore, when air pressure is introduced to one of air cylinders 74 or 75, all of the members 66 that are secured to the rod to which the actuated air cylinder is connected are moved in a counterclockwise direction to move the noses 69 out of engagement with the central hubs 13 and because the rod 82 is in a disengaged position below plane 22, the reels will roll through the discharge opening 62 into the spaces between members 25 and against the rod 55 where they will be held in alignment with the drive units 11. Since the radial slots 18 were aligned in the storage device 21 and each of the alternate reels roll the same distance before engaging the rod 55, the slots will still be in alignment when the reels come to rest in the mounting station 23. After the reels have been positioned in the mounting station 23, the air cylinder 42 is actuated to move the members 25 to the left, thereby clamping and holding the set of empty reels and drive units in an aligned relationship. In this closed position, the bracket 33 is then moved along rods 26 and toward the assembled reels and drive units for inserting the arbor 10 into the drive units 11, reels 12 and the bearing sleeve 16. The assembled unit is then lifted from the members 25 and replaced on the winding machine. In this position of the device, it is now ready to receive another assembly of fully wound reels from which the arbor 10 is to be removed, the full reels separated from the drive units, and a set of empty reels positioned on the arbor. The second set of empty reels is released by actuating the other of air cylinders 74 or 75 which releases the reels remaining in the enclosure 60. However, in order to receive this set of reels, the members 25 must be shifted to the left by a distance equivalent to one reel spacing in order to align the spaces between members 25 with the second set of reels that is to be delivered thereto. This is accomplished by actuating the air cylinder 39 which moves all of the members 25 along rods 26 the necessary distance. This air cylinder retains the members 25 in this position until the empty reels have been positioned in alignment with the drive units 11 at which time the air cylinder 39 permits the members 25 to be returned to their normally closed position by the air cylinder 42.

With reference to FIG. 5, all of the air cylinders are commercially available solenoid-operated air cylinders with air cylinders 39 and 45 being spring-returned and responsive to 80 lbs. per sq. in., and air cylinders 42, 58, 74, 75 and 86 responsive to 40 lbs. per sq. in., the latter group being normally maintained in a disabled position in response to 10 lbs. per sq. in.

With reference to FIGS. 5 and 6, the solenoids 90–97 are interconnected to a 6-position stepping switch 98 so as to energize the air cylinders in the necessary combinations for providing a complete cycle of operation. Assuming that the assembly including arbor 10, full reels 12 and drive units 11 has been positioned on the members 25, the stepping switch 98 is then in the first position in which 98–1 is closed. The solenoids 91 and 92 are therefore energized and air is applied to the air cylinders 42 and 58, which respectively hold the members 25 in their closed position and the bail member 54 in its position in which it engages the flanges of the full reels 12. The bracket 33 is then moved to the left to withdraw the arbor 10. The switch 98 is then moved to the second position in which 98–2 is closed. The solenoids 90 and 96 are then energized and air is applied to the air cylinders 42 and 45 which respectively move the right-hand member 25 to a position in which resilient members 47 separate the members 25 to permit the full reels to separate from the drive units 11, bail member 54 having returned to its disengaged position, and limit the movement of the members 25. Assuming that a group of reels has been loaded into the storage device 21, the switch 99 is then actuated to a closed position by the operator to energize the motor 81, timer 88 and solenoid 97 and air is applied to air cylinder 86 for moving the rod 82 against the reels in the storage device for orienting the radial slots 18, as described above. The timer 88 de-energizes motor 81, and at that time, switch 99 is then released by the operator. When switch 98 is moved to the third position, 98–3 is closed and solenoids 90, 92, 94 and 96 are energized. Air is then applied to the cylinders 42, 58, 74 and 45 to hold members 25 in the open position, to move bail member 54 to its position for engaging the flanges of the reels positioned in mounting station 23, for releasing ten of the reels in enclosure 60 for movement into the mounting station 23, and for maintaining the limit of movement of members 25. In the fourth position, 98–4 is closed and relays 91 and 92 are energized. Air is then applied to cylinder 42 for moving members 25 to the closed position and for retaining bail member 54 in its reel engaging position. The bracket 33 is then moved to the right to insert arbor 10 into the empty reels, drive units and bearing sleeve 16. The arbor with the empty reels is then removed and another arbor with full reels positioned on the members 25 and the arbor withdrawn. Since one set of reels has been released, the members 25 must not only be moved to the open position, but must be shifted to align the spaces between the members with the set of reels remaining in the storage device 21. This is accomplished when switch 98 is placed in the fifth position and 98–5 is closed to energize solenoids 91 and 92. Air is then applied to cylinders 39 and 42 to shift the left-hand member 25 and the right-hand member 25, thereby permitting resilient means 47 to open members 25 so that the spaces therebetween are now aligned with the reels in storage device 21 and to permit the full reels on the arbor to move into the receiving unit 24. The sixth position of switch 98 provides for release of the set of reels remaining in the storage device 21. When 98–6 is closed, solenoids 90, 92, 93 and 95 are energized. Air is then applied to cylinders 42 and 39 to hold members 25 in their open position, to cylinder 58 to move bail member 54 into its reel engaging position, and to cylinder 75 to release the set of reels in storage device 21 for movement into mounting station 23. The switch 98 is then returned to its first position in which cylinder 42 returns the members 25 to their original closed position for receiving the arbor. The arbor is then removed and another arbor positioned on members 25. At this time, storage device 21 must again be supplied with another group of reels.

From the above description, it should be evident that the device provides for not only removing a set of reels from an arbor and replacing a second set of reels on the arbor, but also lends itself to only removal of the reels or for positioning a set of reels and drive units on an arbor. In addition, the storage device provides for retaining and orienting a plurality of reels, as well as discharging only selected ones of the reels. Accordingly, the invention is not to be limited to the disclosed embodiment, but is of a scope as defined by the appended claims.

We claim:

1. A device for replacing a first group of members rotatably mounted on an arbor with a second group of members comprising, in combination:

a mounting station;

means for supporting said arbor in said mounting station;

means for engaging one end of said arbor, when it is positioned on said supporting means, said engaging means being movable to withdraw said arbor from said first group of members and to insert said arbor into said second group of members when the latter are positioned in said mounting station;

means for retaining said second group of members initially in a station displaced from said mounting station;

means defining a path for movement of said second group of members into said mounting station;

means arranged in said mounting station and movable between an engaging position for holding said first group of members in axial alignment with each other after said arbor is removed and a release position for permitting said first group of members to move out of their aligned relationship, and for holding said second group of members in axial alignment with said arbor after said first group of members has been released; and means for releasing said retaining means after said first group of members has been released from said mounting station to permit movement of said second group of members into said mounting station.

2. A device for replacing a first set of reels rotatably mounted on an arbor and separated axially from each other by a spacer member arranged between and engaging each adjacent reel with a second set of reels comprising, in combination:

a work bed;

means including a plurality of support members arranged in spaced relation so as to engage each of said spacer members for supporting said arbor and adapted to be moved along said work bed between a first position in which said arbor is withdrawn from said first set of reels and inserted into said second set of reels and a second position in which said support members retain said spacer members in an aligned relationship with each other and the space between said support members is increased to permit separation of said first set of reels from said spacer members and to receive said second set of reels therebetween;

means for retaining said second set of reels initially in a station spaced from said support members and aligned with the spaces between said support members when the latter are in said second position;

means defining a path for movement of said second set of reels into said spaces;

means for engaging one end of said arbor when it is positioned on said support members and movable along said work bed to withdraw said arbor from said first set of reels and to insert said arbor into said second set of reels and said spacer members when said support members are in said first position;

means coupled to said support members and movable along said work bed for moving said support members between said first and second positions;

means movable between an engaging position for holding said first set of reels in axial alignment with said spacer members, when said arbor is removed and said support members are moved to said second position, and a release position for permitting said first set of reels to separate from said spacer members, and for holding said second set of reels in axial alignment with said spacer members when in said engaging position, after said first set of reels has been released and during movement of said support members to said first position to receive said arbor; and means for releasing said retaining means to permit movement of said second set of reels into said spaces after said first set of reels has been separated from said spacer members.

3. A device for replacing a first set of flanged reels rotatably mounted on a splined arbor with a second set of flanged reels, each reel in said sets of reels having a hub and a radial slot in at least one flange and each reel in a set of reels on said arbor being axially separated from the adjacent reel by a drive unit releasably coupled to said arbor and in engagement with at least one of the reels adjacent thereto, the combination comprising:

a work bed including a mounting station;

means including a plurality of members arranged in said mounting station in spaced relation so as to engage each of said drive units for supporting said arbor and adapted to be moved along said work bed between a first position in which said arbor is withdrawn from said first set of reels and inserted into said second set of reels and a second position in which said members retain said drive units in an aligned relationship with each other and the space between said members is increased to permit separation of said first set of reels from said drive units and to receive said second set of reels therebetween;

means for retaining said second set of reels initially in a storage station spaced from said mounting station and aligned with the spaces between said members when the latter are in said second position;

means defining a path for movement of said second set of reels into said spaces between said members;

means for engaging one end of said arbor when it is positioned in said mounting station and movable along said work bed to withdraw said arbor from said first set of reels and to insert said arbor into said second set of reels and said drive units when said members are in said first position;

means coupled to said members and movable along said work bed for moving said members between said first and second positions;

means movable between an engaging position for holding said first set of reels in axial alignment with said drive units, when said arbor is withdrawn and said members are in said second position, and a release position for permitting said first set of reels to separate from said drive units, and for holding said second set of reels in axial alignment with said drive units, when in said engaging position and said first set of reels has been released and during movement of said members to said first position to receive said arbor; and means for releasing said retaining means to permit movement of said second set of reels into said spaces after said first set of reels has been separated from said drive units.

4. A device in accordance with claim 3 wherein said retaining means comprises a plurality of pivotal members arranged in said storage station to engage the hubs of said second set of reels and adapted to be moved to a position for releasing said second set of reels for movement into said spaces between said members, and means coupled to said pivotal members for moving the latter simultaneously into said releasing position.

5. A device in accordance with claim 4 and including drive means adapted to be moved into a position for engaging the flanges of said second set of reels while retained by said pivotal members for rotating said reels to orient said radial slots, and means coupled to said drive means for moving the latter between a disengaged position and said engaging position.

6. A device in accordance with claim 5 including means for controlling the period of time during which said moving means holds said drive means in said engaging position.

7. A device in accordance with claim 3 wherein said holding means comprises a bail member pivotally mounted adjacent each end of said mounting station and adapted to engage the flanges of the reels in said mounting station, and means coupled to said bail member and actuatable for moving said bail member between said engaging and release positions.

8. A device in accordance with claim 3 wherein said moving means comprises resilient means arranged between each of said members in said mounting station for moving the latter into said second position when said engaging means withdraws said arbor.

9. A device for withdrawing an arbor from a set of reels rotatably mounted thereon and axially separated from each other by a spacer member arranged between and engaging each adjacent reel comprising, in combination:
 a work bed;
 means including a plurality of support members arranged in spaced relation so as to engage each of said spacer members for supporting said arbor and for retaining said spacer members in an aligned relationship with each other when said arbor is withdrawn, and adapted to be moved along said work bed;
 means for engaging one end of said arbor, when it is positioned on said support members, and movable along said work bed to withdraw said arbor from said set of reels and said spacer members;
 means coupled to said support members and movable along said work bed for moving said support members and said spacer members in an axial direction to an open position in which the distance between said support members is increased;
 means for engaging and holding said set of reels in axial alignment with said spacer members after said arbor is withdrawn and said support members are in said open position; and
 means for releasing said engaging and holding means when said support members are in said open position to permit said set of reels to separate from said spacer members.

10. A device for withdrawing an arbor from a set of reels rotatably mounted thereon and axially separated from each other by a drive unit releasably coupled to said arbor and arranged between and in engagement with at least one of the reels adjacent thereto comprising, in combination:
 a work bed;
 means including a plurality of members arranged in spaced relation so as to engage each of said drive units for supporting said arbor and for retaining said drive units in an aligned relationship with each other when said arbor is withdrawn, and adapted to be moved along said work bed;
 means for engaging one end of said arbor, when it is positioned on said members, and movable along said work bed to withdraw said arbor from said set of reels and said drive units;
 means coupled to said members and movable along said work bed for moving said members and said drive units in an axial direction to an open position in which the distance between said members is increased and said drive units are disengaged from said reels;
 means for engaging and holding said set of reels in axial alignment with said drive units after said arbor is withdrawn and said members are in said open positions; and
 means for releasing said engaging and holding means when said members are in said open position to permit said set of reels to separate from said drive units.

11. A device in accordance with claim 10 wherein said moving means comprises resilient means arranged between each of said members for moving the latter into said open position when said engaging means withdraws said arbor.

12. A device in accordance with claim 10 wherein said engaging and holding means comprises a bail member mounted on said work bed and in engagement with said set of reels.

13. A device for mounting a group of members on an arbor, comprising in combination:
 a work bed including a mounting station;
 means for retaining said group of members in a station displaced from said mounting station and providing a path for movement of said group of members into said mounting station;
 means arranged in said mounting station for engaging and holding said group of members in axial alignment;
 means for releasing said retaining means to permit movement of said group of members into said mounting station; and
 means for engaging one end of said arbor and supporting the latter in a position axially aligned with said group of members when they are in said mounting station and movable on said work bed in a direction toward said mounting station for inserting said arbor into said group members.

14. A device for mounting a set of reels on an arbor with said reels axially separated from each other by a spacer member arranged between and in engagement with adjacent reels comprising, in combination:
 a work bed;
 means including a plurality of support members arranged in spaced relation for retaining said spacer members in an aligned relationship with each other to receive said arbor and adapted to be moved along said work bed;
 means for retaining said set of reels in a station spaced from said support members, each of said reels being aligned with a space between said support members;
 means defining a path for movement of said reels from said station into their respective spaces;
 means adapted to engage and hold said reels in alignment with said spacer members upon movement of said reels into their respective spaces;
 means for releasing said retaining means to permit movement of said reels into said spaces;
 means coupled to said support members and movable along said work bed for moving said support members into a closed position in which said spacer members and said reels are in engagement with each other; and
 means for engaging one end of said arbor and supporting the latter in a position axially aligned with said spacer members and said reels and movable on said work bed in a direction toward said spacer members and said set of reels, when said support members are in said closed position, for inserting said arbor into said spacer members and said set of reels.

15. A device for mounting a set of reels on an arbor with said reels axially separated from each other by a drive unit releasably coupled to said arbor and arranged between each successive reel and in engagement with at least one of the reels adjacent thereto comprising, in combination:

a work bed including a mounting station;

means including a plurality of members arranged in said mounting station in spaced relation for retaining said drive units in an aligned relationship to receive said arbor and adapted to be moved along said work bed;

means displaced from said mounting station for retaining each reel in said set of reels in an aligned relationship with a space between said members;

means defining a path for movement of said reels into their respective space;

means adapted to engage and hold said reels in alignment with said drive units upon movement of said reels into said mounting station;

means for releasing said retaining means to permit movement of said reels into said mounting station;

means coupled to said members and movable along said work bed for moving said members into a closed position in which said drive units and said reels are moved into engagement with each other; and means for engaging one end of said arbor and supporting the latter in a position beyond said mounting station and axially aligned with said drive units and movable on said work bed toward said mounting station, when said members are in said closed position, for inserting said arbor into said drive units and said set of reels.

16. A device for mounting a set of flanged reels on a splined arbor, each reel in said set of reels having a hub and a radial slot in at least one flange and being axially separated from the adjacent reel by a drive unit releasably coupled to said arbor and in engagement with at least one of the reels adjacent thereto comprising, in combination:

a work bed including a mounting station;

means including a plurality of members arranged in said mounting station in spaced relation for retaining said drive units in an aligned relationship and for receiving said set of reels, and adapted to be moved along said work bed;

means displaced from said mounting station for retaining each reel in said set of reels in an aligned relationship with a space between said members;

means defining a path for movement of said reels into their respective spaces;

means engaging the flanges of said reels when said reels are held by said retaining means for aligning said radial slot in each reel;

means adapted to engage and hold said reels in alignment with said drive units upon movement of said reels into said mounting station;

means for releasing said retaining means to permit movement of said reels into said mounting station;

means coupled to said members and movable along said work bed for moving said members into a closed position in which said drive units and said reels are moved into engagement with each other; and means for engaging one end of said arbor and supporting the latter in a position beyond said mounting station in which it is axially aligned with said drive units and movable along said work bed toward said mounting station, when said members are in said closed position, for inserting said arbor into said drive units and said set of reels.

17. A device in accordance with claim 16 wherein said members are retained in said spaced relation by resilient means arranged between each of said members, said resilient means being compressible to reduce said spaced relation when said members are moved into said closed position.

18. A device in accordance with claim 16 wherein said retaining means comprises a plurality of pivotal members arranged to engage the hubs of said set of reels and adapted to be moved to a position for releasing said reels for movement into said spaces between said members.

19. A device in accordance with claim 18 and including drive means adapted to be moved into a position for engaging the flanges of said set of reels, while retained by said pivotal members, for rotating said reels to orient said radial slots, and means coupled to said drive means for moving the latter between a disengaged position and said engaging position.

20. A device for replacing a first set of flanged reels rotatably mounted on a splined arbor with a second set of flanged reels, each reel having a hub and a radial slot in at least one flange and each reel in a set of reels on said arbor being axially separated from the reel adjacent thereto by a drive unit releasably coupled to said arbor and in engagement with at least one of the reels adjacent thereto comprising, in combination:

a work bed including a mounting station;

means for retaining a group of reels in a position spaced from said mounting station in which alternate reels are adapted to be released for movement into said mounting station as said second set of reels;

means defining a path for movement of said second set of reels into said mounting station;

means including a plurality of members arranged in said mounting station in spaced relation so as to engage each of said drive units for supporting said arbor, adapted to be moved along said work bed between a first position in which said arbor is withdrawn from said first set of reels and inserted into said second set of reels, and a second position in which said members retain said drive units in an aligned relationship with each other and the space between said members is increased to permit separation of said first set of reels from said drive units and to receive said second set of reels therebetween, and adapted to be moved as a unit so as to position the spaces between said members relative to the alternate reels comprising said second set of reels;

means for engaging one end of said arbor, when it is positioned in said mounting station, and movable along said work bed in a direction to withdraw said arbor from said first set of reels and to insert said arbor into said second set of reels and said drive units when said members are in said first position;

means coupled to said members and movable along said work bed for moving said members between said first and second positions;

means movable between an engaging position for holding said first set of reels in axial alignment with said drive units, when said arbor is withdrawn and said members are in said second position, and for holding said second set of reels in axial alignment with said drive units when in said engaging position and said first set of reels have been released and during movement of said members to said first position to receive said arbor;

means for releasing said retaining means to permit movement into the spaces between said members of the reels in said group of reels comprising said second set of reels that are aligned with said spaces after said first set of reels has been separated from said drive units; and means coupled to said supporting means for reciprocating said members axially so as to align the spaces between said members with one set of the alternate reels in said group of reels with each successive arbor positioned on said supporting means.

21. A device in accordance with claim 20 wherein said retaining means comprises a plurality of pivotal members arranged in said position spaced from said mounting station to engage the hubs of said group of reels, alternate ones of said pivotal members being adapted to be moved to a position for releasing their respective reels for movement into said mounting station, and wherein said releasing means comprises first means coupled to one alternate group of pivotal members for moving the latter simultaneously into said releasing position, and second means coupled to the other alternate group of pivotal members for moving the latter simultaneounly into said releasing position, said first and second moving means being actuatable successively.

22. A device in accordance with claim 21 and including drive means adapted to be moved into a position for engaging the flanges of said group of reels, while retained by said pivotal members, for rotating said reels to orient said radial slots, and means coupled to said drive means for moving the latter between a disengaged position and said engaging position.

23. A device in accordance with claim 22 including means for controlling the length of time that said drive means rotates said reels.

24. A device in accordance with claim 20 wherein said holding means comprises a bail member pivotally mounted adjacent each end of said mounting station and adapted to engage the flanges of the set of reels in said mounting station, and means coupled to said bail member and actuatable for moving said bail member between said engaging and release positions.

25. A device in accordance with claim 20 wherein said support means includes resilient means arranged between each of said members in said mounting station and cooperating with said moving means to maintain an equal spatial relation between said members when the latter are in said open position.

26. A device for receiving a plurality of reels, each of which has a hub, at least one flange and a radial slot in said flange, and discharging said reels with said slots in an oriented relationship comprising, in combination:
  a casing having a first opening at one end for receiving said reels and a second opening at the other end through which said reels are discharged;
  a plurality of guide members arranged within said casing and spaced from each other to provide a plurality of tracks for the hubs of said reels;
  means arranged adjacent said second opening for engaging the hub of each reel to retain said reels in axial alignment within said casing;
  means movable into engagement with the flanges of said reels within said casing for rotating said reels and orienting said radial slots; and
  means for releasing said engaging and retaining means, after said radial slots have been oriented, to permit movement of said reels through said discharge opening.

27. A device in accordance with claim 26 wherein said engaging and retaining means comprises a pivotally mounted lever arranged in alignment with each of said plurality of tracks for engaging the hubs of said reels placed in said first opening, and means coupled to each of said levers and actuatable, after said radial slots have been oriented, for moving said levers to a position in which said reels are permitted to move through said discharge opening.

28. A device in accordance with claim 26 wherein said rotating and orienting means comprises drive means adapted to be moved into a position for engaging the flanges of said reels retained by said engaging and retaining means for rotating said reels to orient said radial slots, and means coupled to said drive and actuatable for moving the latter between a disengaged position and said engaging position.

29. A device in accordance with claim 28 including means for controlling the length of time that said drive means rotates said reels.

30. A device for receiving a group of reels, each of which has a hub, at least one flange and a radial slot in said flange, and discharging said reels with said slots in an oriented relationship comprising, in combination:
  a casing having a first opening at one end for receiving said reels and a second opening at the other end through which said reels are discharged;
  a plurality of guide members arranged within said casing and spaced from each other to provide a plurality of tracks for the hubs of said reels;
  means arranged adjacent said second opening for engaging the hub of each reel to retain said reels in axial alignment with each other within said casing;
  means movable into engagement with the flanges of said reels for rotating said reels and orienting said radial slots;
  first means coupled to alternate ones of said engaging and retaining means and actuatable for moving the latter into a position to release the respective reels; and
  second means coupled to the others of said engaging and retaining means and actuatable for moving the latter into a position to release the respective reels, said first and second moving means being actuatable successively.

31. A device in accordance with claim 30 wherein said first means comprises a first air cylinder coupled to alternate ones of said engaging and retaining means for moving the latter into a position to release the respective reels, and said second means comprises a second air cylinder coupled to the others of said engaging and retaining means for moving the latter into a position to release the respective reels, said first and second air cylinders being successively actuatable to release their respective set of reels.

References Cited by the Examiner

UNITED STATES PATENTS

| | | | |
|---|---|---|---|
| 2,736,507 | 2/1956 | Neese et al. | 242—55 |
| 2,772,838 | 12/1956 | Lenz | 242—55 |
| 3,075,719 | 1/1963 | Hornstein et al. | 242—65 |

MERVIN STEIN, *Primary Examiner.*